United States Patent [19]

Lippe et al.

[11] Patent Number: 5,058,716
[45] Date of Patent: Oct. 22, 1991

[54] CONTROL SYSTEM FOR A HYDROKINETIC TORQUE CONVERTER LOCK-UP CLUTCH

[75] Inventors: Wolfgang V. D. Lippe, Konigswinter; Sieghart Biederman; Winfried Schulz, both of Pulheim; Hans-Peter Wirtz; Johann Kirchhoffer, both of Cologne, all of Fed. Rep. of Germany

[73] Assignee: Ford Motor Company, Dearborn, Mich.

[21] Appl. No.: 570,757

[22] Filed: Aug. 22, 1990

[30] Foreign Application Priority Data

Aug. 25, 1989 [DE] Fed. Rep. of Germany ....... 3828048

[51] Int. Cl.⁵ ............................................. F16D 33/12
[52] U.S. Cl. .................................... 192/3.33; 192/3.3; 192/3.31
[58] Field of Search .................... 192/3.3, 3.31, 3.33

[56] References Cited

U.S. PATENT DOCUMENTS

| | | | |
|---|---|---|---|
| 4,051,932 | 10/1973 | Arai et al. | 192/3.3 |
| 4,391,166 | 7/1983 | Kubo et al. | 192/3.31 X |
| 4,582,185 | 4/1986 | Grimes et al. | 192/3.31 X |
| 4,720,003 | 1/1988 | Murasugi | 192/3.31 X |
| 4,843,920 | 7/1989 | Hayasaki et al. | 192/3.3 X |
| 4,880,090 | 11/1989 | Ando | 192/3.3 |
| 4,966,263 | 10/1990 | Hayasaki | 192/3.3 |

FOREIGN PATENT DOCUMENTS

| | | |
|---|---|---|
| 3121749 | 10/1985 | Fed. Rep. of Germany. |
| 3103838 | 4/1986 | Fed. Rep. of Germany. |
| 3818102 | 8/1988 | Fed. Rep. of Germany. |
| 3130871 | 9/1988 | Fed. Rep. of Germany. |
| 137754 | 8/1982 | Japan ................................... 192/3.31 |
| 196464 | 10/1985 | Japan ................................... 192/3.3 |
| 35161 | 2/1987 | Japan ................................... 192/3.3 |

Primary Examiner—Allan D. Herrmann
Assistant Examiner—Nicholas Whitelaw
Attorney, Agent, or Firm—Frank G. McKenzie; Keith L. Zerschling

[57] ABSTRACT

A control system for a torque converter lock-up clutch operates in a hydraulic circuit having line pressure applied to a lock-up clutch control valve and supplied selectively to a clutch-apply pressure chamber or a clutch-release pressure chamber. The control valve includes a valve spool, four control lands and a valve spring urging the control body to a starting position where the valve directs line pressure to the release pressure chamber and connects the apply pressure chamber to a cooler. When control pressure is applied, the valve spool moves to a shift-up position, supplies line pressure to the apply pressure chamber and connects the release-pressure chamber to an outlet line. A pulse-width modulated solenoid valve varies pressure in the release-pressure chamber by means of a throttle opening in the clutch plate, whereby control pressure is modulated so that force between the friction surfaces of the clutch is reduced to allow clutch slippage.

18 Claims, 7 Drawing Sheets

CONTROL SYSTEM FOR A HYDROKINETIC TORQUE CONVERTER LOCK-UP CLUTCH

BACKGROUND OF THE INVENTION

1. Field of the Invention

This invention relates to an automatic transmission torque converter lock-up clutch actuated by a pressurized hydraulic control circuit.

2. Description of the Prior Art.

German patent Document DE-PS 31 21 749 discloses a method to control a clutch located between a driving shaft and a driven shaft and a control system for a hydrokinetic torque converter lock-up clutch. The method of control includes detecting a deviation from the speed of the driving shaft using a sensor and controlling the difference in speed of the driving shaft and driven shaft such that this speed difference is greater than the detected deviation in the speed of the driving shaft.

This known method of control enables the difference, resulting from slippage, in the speed of the driving and driven shafts to be kept greater than the irregularity after a certain irregularity has been detected in the driving shaft. Undesirable effects of torsional vibrations of an internal combustion engine on the hydrokinetic, mechanical compound transmission can be avoided by this control technique.

The method of control described in the '749 document has the disadvantage of requiring a relatively complex microprocessor in order to calculate a relatively great slippage, corresponding to the respective difference in speeds of the driving shaft and driven shaft and to provide a corresponding control variable if irregularity in speed of the driving shaft results. The control system includes a lock-up clutch control valve to which pressurized hydraulic fluid is applied under line pressure, which is regulated by an associated pressure modulating valve in the form of a pulse-width modulated PWM solenoid valve, electrically triggered directly by a microprocessor.

The microprocessor also triggers a lock-up clutch, which operates at different states depending on the shift positions of the compound transmission.

German patent Document DE-PS 31 30 871 discloses a control system for a torque converter lock-up clutch supplied with pressurized fluid through a hydraulic circuit in a compound transmission. Hydraulic fluid at line pressure is supplied to a lock-up clutch pressure control valve and is supplied selectively to an application pressure chamber or a release pressure chamber as a function of the operating states by the action of control pressure. The lock-up clutch pressure control valve consists of a valve body, having three control lands located in a valve cylinder, held by a valve spring in a starting position where it conveys line pressure between control lands 2 and 3 to the release pressure chamber, and connects the application pressure chamber between control lands 1 and 2 to a cooler. A control pressure, which is controlled by an electromagnetic valve, is applied at control land 3 to move the valve body against the force of the spring into its shift-up position, where it conveys line pressure between control lands 1 and 2 to the application pressure chamber and connects the release pressure chamber to the cooler.

The control system of the '871 document has the disadvantage that, in addition to the normal lock-up clutch control valve, it requires a lock-up clutch pressure control valve on which a pressure reducing valve and an electromagnetic valve also operate. The production costs are therefore relatively high.

German patent Document DE-OS 38 18 102 discloses a control device for a torque converter lock-up clutch operating in a compound transmission and actuated by pressurized hydraulic fluid. In the control system of the '102 document, a lock-up clutch pressure control valve consists of a valve body having three control lands arranged in a valve cylinder, the valve being held in its starting position by a valve spring. An electromagnetic valve produces, on one end of the valve spool, a control pressure, which varies as a function of the torque transmitted. The necessary torque transmission capacity is determined by comparison of the driving shaft speed and the driven shaft speed, and a corresponding magnitude of control pressure stored in a memory is associated with a torque capacity in order to allow desired slippage.

Here also, the microprocessor must provide additional application and release functions to the lock-up clutch.

German patent Document DE-PS 31 03 838 discloses a control device for a lock-up clutch of a hydrokinetic torque converter supplied with pressurized hydraulic fluid in a compound transmission. Hydraulic fluid is supplied at line pressure to a lock-up clutch control valve, and is supplied selectively to an application pressure chamber or a release Pressure chamber as a function of operating states by the effect of control pressure. The lock-up clutch control valve includes a valve body and four control lands, located in a valve cylinder and held by a valve spring in a starting position, where it directs line pressure between control lands 1 and 2 to the release pressure chamber and connects the application pressure chamber through a line to a cooler. Hydraulic fluid is directed also between control lands 2 and 3 to an outlet, where control pressure is applied at control land 4 to move the valve body against the force of a valve spring to its shift-up position, where it supplies line pressure between control lands 2 and 3 through the cooler to the application pressure chamber of the torque converter. The release pressure chamber is connected between control lands 1 and 2 to an outlet.

SUMMARY OF THE INVENTION

This invention, based on a control system without slippage control, has as an object providing slippage control of a lock-up clutch with a minimum number of alterations in the control valve system and low production cost related to a microprocessor.

In the outlet line located between control lands 1 and 2 formed on the valve spool, there is located a pressure control valve constructed as a pulse-width-modulated solenoid valve, which applies an opposing pressure in the release pressure chamber against line pressure acting in the application pressure chamber. The opposing pressures are variable in magnitude in order to adapt actual slippage of the lock-up clutch to the desired speed difference between the driving shaft and driven shaft, the difference being stored in a characteristics map in electronic memory accessible to the microprocessor.

Because the solenoid, which moves the valve spool in the valve cylinder of the lock-up clutch control valve, is constructed directly as a pulse-width modulatable solenoid, application or release of the lock-up clutch and the magnitude of permitted slippage of the lock-up clutch when applied are controlled by a single solenoid valve.

An embodiment of the invention allows an active increase in the opposing pressure in the release chamber and a reduction in production costs. These advantages are achieved because the opposing pressure at the lock-up clutch pressure control valve, which controls slippage, is loaded directly with the supply pressure because of the presence of the pulse-width modulated solenoid.

BRIEF DESCRIPTION OF THE DRAWINGS

The invention is described in more detail with reference to embodiments illustrated in the accompanying drawings.

DESCRIPTION OF THE PREFERRED EMBODIMENTS

Figure 1:
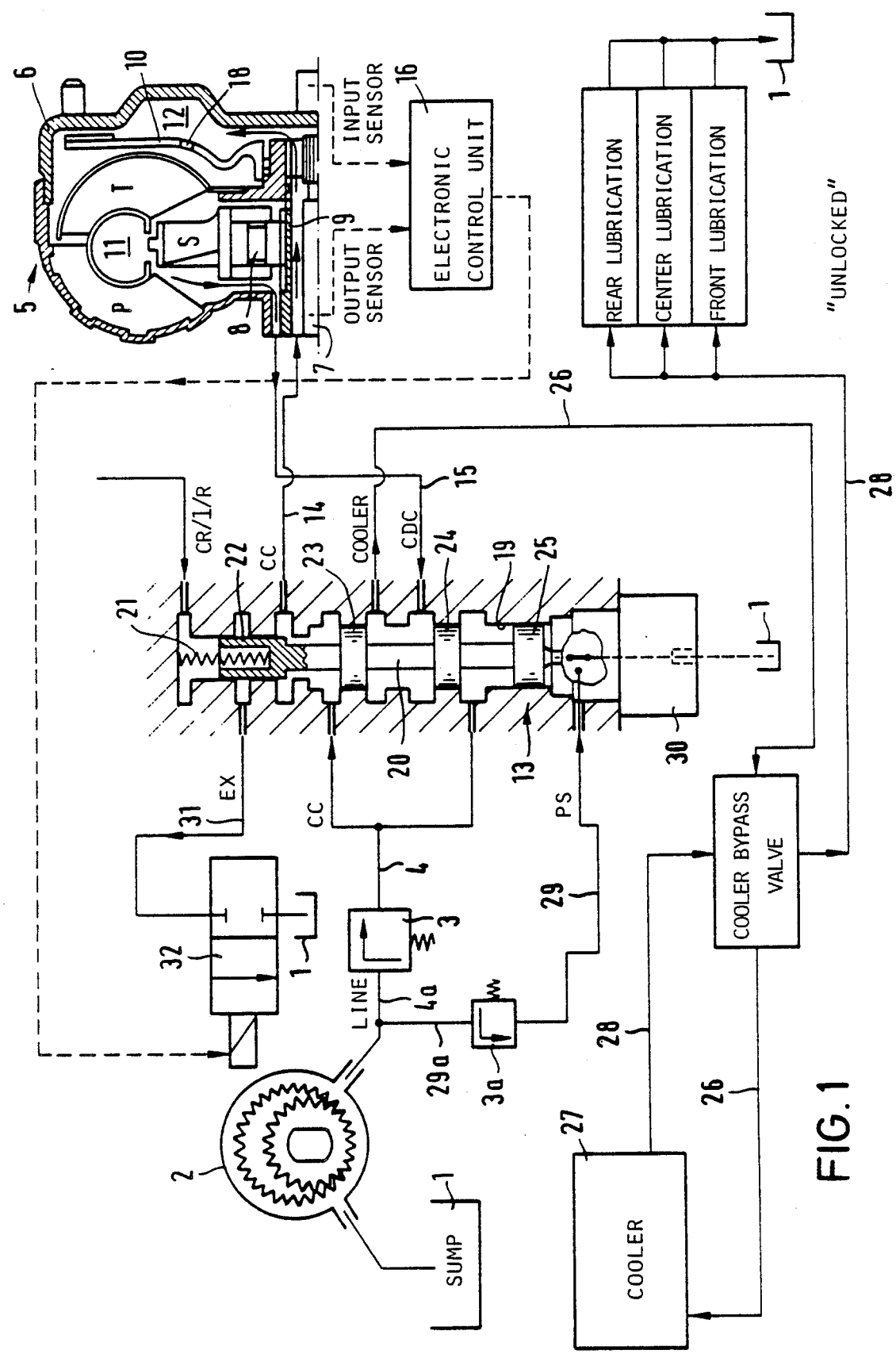
FIG. 1 shows a schematic diagram of a control valve system for an automatic transmission in which only the valves and hydraulic lines required to control a lock-up clutch are shown. The circuit components are disposed to unlock, open, disengage or release the lock-up clutch.
Figure 2:
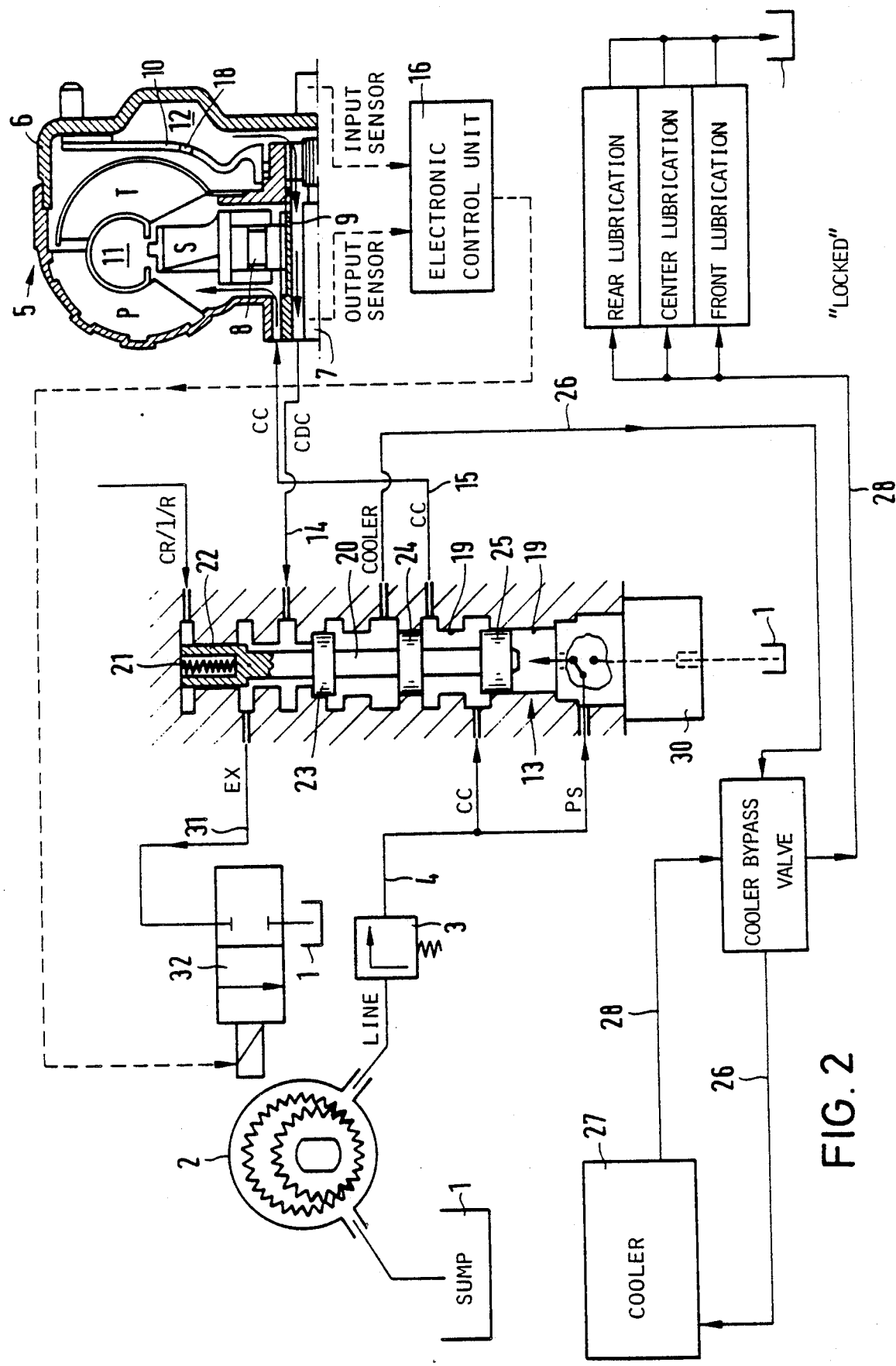
FIG. 2 shows a schematic circuit diagram similar to FIG. 1 having the components of the circuit disposed to lock, close, engage or apply the lock-up clutch.

FIGS. 1 and 2 show details of a control valve system for an automatic transmission for a motor vehicle in which only the components and valves required to control the lock-up clutch of the torque converter are shown.

In the control system, hydraulic fluid is aspirated via a pressure medium pump 2 from a sump 1 and is supplied to a main pressure regulating valve 3, which adjusts line pressure in a line 4a as a function of the torque requirement and driving speed, line pressure being supplied to a plurality of control valves in the hydraulic control system of the automatic transmission.

A hydrokinetic torque converter 5, whose pump wheel P is connected to a driving cover 6 and to the crankshaft of an internal combustion engine (not shown), is a component of a hydrokinetic/mechanical compound transmission.

The turbine wheel T is connected to a driven or turbine shaft 7, which forms the input shaft of a planetary gear, compound transmission.

Between pump wheel P and turbine wheel T, there is located a guide wheel S, which is supported in a conventional manner by a one-way clutch 8 on a hollow shaft 9 fixed to the transmission housing.

A clutch plate 10 of a torque converter lock-up clutch is arranged axially movably and nonrotatably between the driving cover 6 and the turbine wheel T on the turbine wheel hub.

Hereinafter, the torque converter chamber is called application chamber 11 and the space between clutch plate 10 and the driving cover 6 is called release chamber 12.

A lock-up clutch control valve 13 operates to pressurize the release chamber 12 through hydraulic line 14, and to pressurize the application chamber 11 through hydraulic line 15.

Speed sensors produce electronic signals representing the rotational speed of driving cover 6 and driven shaft 7, which signals are supplied as input to an electronic control unit 16 that determines the respective difference between the speed of the driven cover 6 and the speed of driven shaft 7. The control unit 16 then calls up a value of the desired slippage, or difference between the speed of the driven cover 6 and driven shaft 7, stored in a characteristics map located in an electronic memory. The control unit produces an electrical signal to a pulse-width modulated solenoid 32, which can influence the pressure in the release chamber 12 by selectively opening and closing line 31 in accordance with the value of the desired slippage stored in the characteristics map.

Throttle openings 18, through the thickness of clutch plate 10, produce a permanent hydraulic connection between application chamber 11 and release chamber 12.

The lock-up clutch control valve 13 includes a valve body or spool 20 located in a valve cylinder 19, held in its starting position by a valve spring 21. The valve body has a first control land 22, a second control land 23, a third control land 24 and fourth control land 25. Line pressure, which is described as "CC/Cooler" pressure (CC=Converter Charge pressure; Cooler=Cooler pressure) or "CDC" pressure (CDC=Converter Discharge) according to the different functions, is applied via hydraulic line 14 between control lands 22 and 23 as well as lands 24 and 25. Between lands 22 and 23, line 14 passes to the release chamber 12, and between lands 23 and 24, line 15 leads to application chamber 11 and line 26 leads to cooler 27. Line 28 connects cooler 27 to lubricant circuits in the transmission.

Valve body 20 is actuated by hydraulic control pressure PS, which can be directed from line 29 by an electrically triggerable solenoid 30 to the underside of valve body 20.

In the present embodiment, solenoid pressure limit valve 3a, supplied through line 29a with line pressure, produces constant control pressure PS, at which pressure all solenoid valves in the transmission are supplied. Valve spool 20 is therefore pressed downward by spring 21 so that line pressure is supplied through line 4 as "CC" pressure between control lands 22 and 23 and through line 14 to release chamber 12 causing the lock-up clutch to be held in its opened position.

In other embodiments, illustrated in FIGS. 3 to 7, control pressure PS is obtained by bleeding line 4. Consequently, PS pressure prevails at the lock-up clutch control valve 13 such that it is checked by a plunger of solenoid 30, provided solenoid 30 is deenergized.

If solenoid 30 is energized with electrical current, control pressure PS is admitted to the valve body and acts on control land 25 to shift valve body 20 against the force of spring 21 into its shift-up position. This shift position is shown in FIG. 2.

Line pressure present in line 4 is carried as "CC" pressure between control lands 24 and 25 and through line 15 to the application chamber 11. Release chamber 12 communicates through line 14 between control lands 22 and 23 to an outlet line 31 in which pulse-width-modulated solenoid 32 is located.

Lock-up clutch 13 is therefore disposed in its applied position, and the pressure drop across throttle opening 18 in the clutch plate 10 is sufficiently great for the lock-up clutch to be completely engaged.

If a specific value of desired slippage of the lock-up clutch is referred to a specific difference between the speed of driving cover 6 and the speed of driven shaft 7, then additional throttling of fluid discharged from release chamber 12 is effected through the lock-up clutch pressure control valve 32 so that the pressure drop at the clutch plate 10 is no longer sufficiently great to fully engage the lock-up clutch and slippage of the clutch plate 10 occurs due to lack of pressure difference.

Throttle openings 18 in the clutch plate 10 can also be arranged in the form of radial channels directly in the friction lining of the clutch plate to ensure adequate and reliable cooling of the sliding clutch plate 10, particularly when the lock-up clutch is slipping.

FIGS. 1 and 2 are identical apart from the indication of the functional pressures, guidance of the control pressure PS, position of valve body 20, and flow direction of the hydraulic fluid. FIG. 1 shows the direction of fluid guidance when lock-up clutch is opened. FIG. 2 shows the direction of fluid when the lock-up clutch is applied.

FIGS. 3-6 show another embodiment of the invention in which there is provided a lock-up clutch pressure control valve 33 comprising a valve spool 35, located in a valve cylinder 34 and held in its starting position by valve spring 36.

Valve spool 35 is provided with control lands 37, 38, 39, 40 and 41 and is actuated by a pulse-width modulated solenoid 42 so that application and release of the lock-up clutch and its various slippage states are controlled by appropriate electric triggering of solenoid 42.

Solenoid 42 has three fluid openings 43, 44 and 45 and two shift positions. When the pulse width of the electric current signal supplied to the solenoid under control of the microprocessor of control unit 16 is 0%, pressurized hydraulic fluid opening 43 is fully closed and openings 44, 45 are fully connected together in the direction of the oil sump. When the pulse width is 100%, hydraulic fluid opening 45 is fully closed to the sump and pressure medium openings 43 and 44 are fully connected together.

When the pulse width has intermediate magnitudes, the length of percentage time valve 33 remains in the two shift positions described above is adjusted in accordance with the pulse width.

Figure 3:
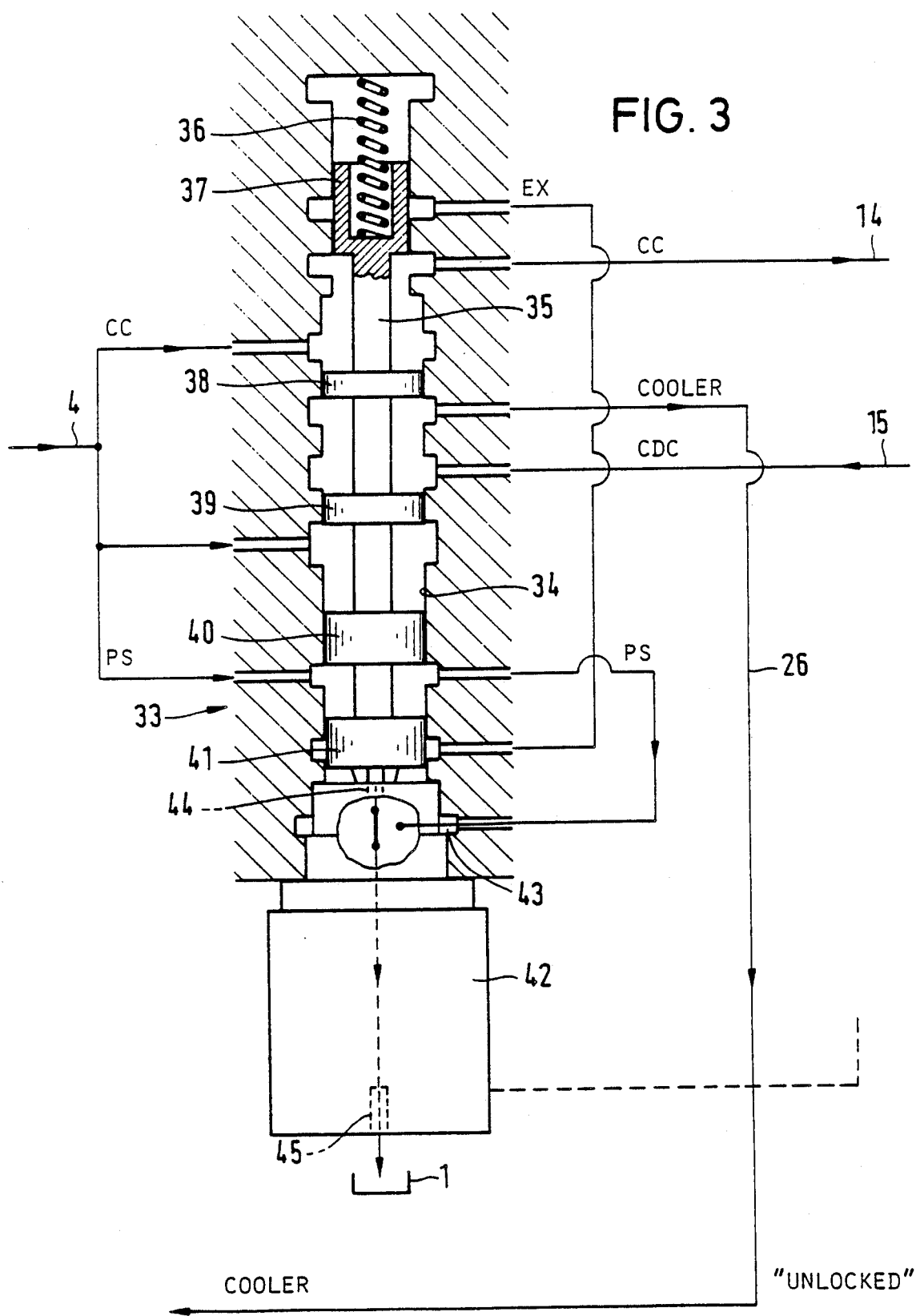
FIG. 3 is an enlarged cross sectional view of a second embodiment of the lock-up clutch pressure control valve and integrated solenoid disposed for open lock-up clutch operation.
Figure 4:
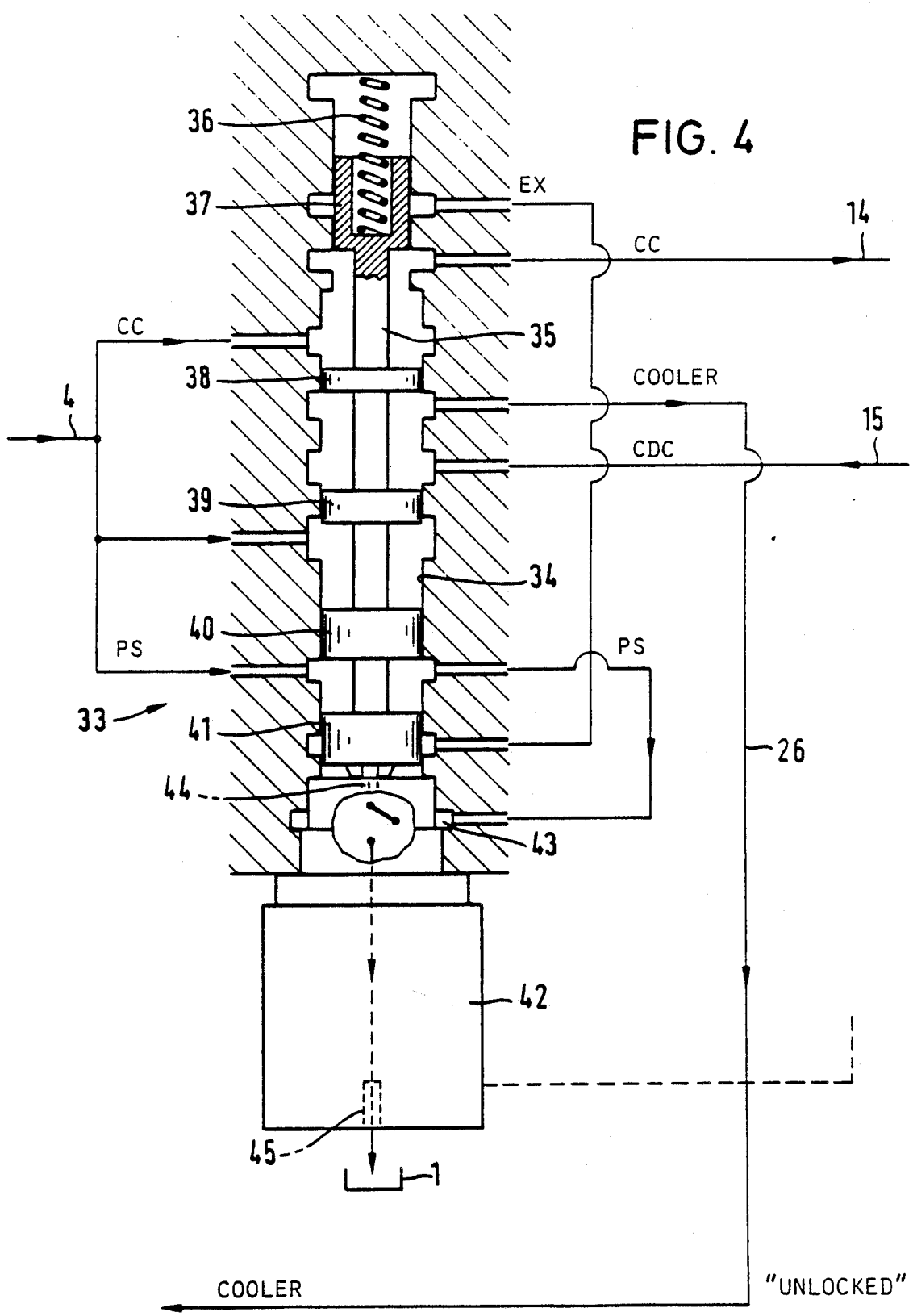
FIG. 4 is a cross section similar to that of FIG. 3 with the components positioned as they are at the beginning of closure of the lock-up clutch.
Figure 5:
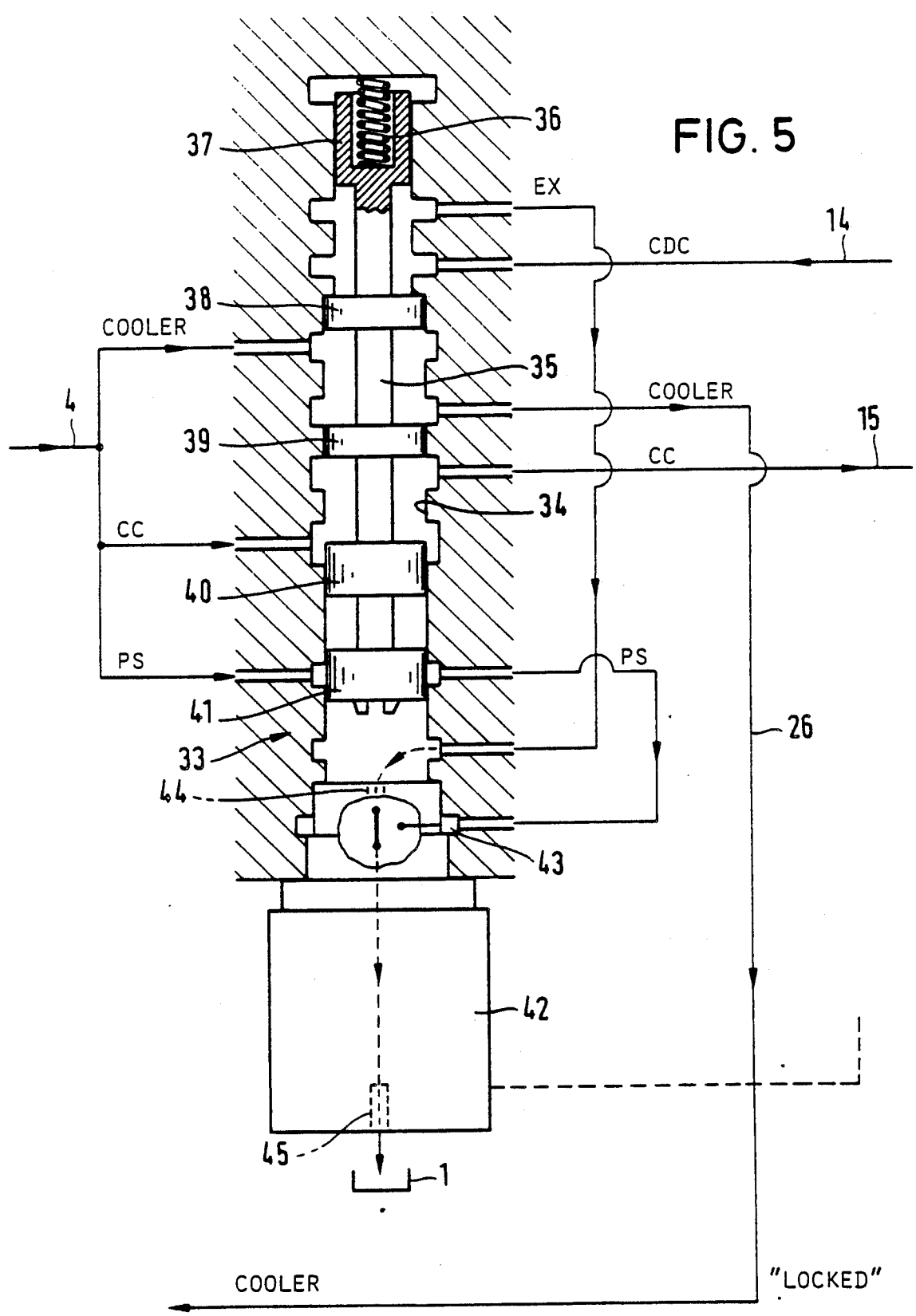
FIG. 5 is a cross section similar to that of FIG. 4 but with the lock-up clutch applied and the solenoid disposed for reducing slippage.
Figure 6:
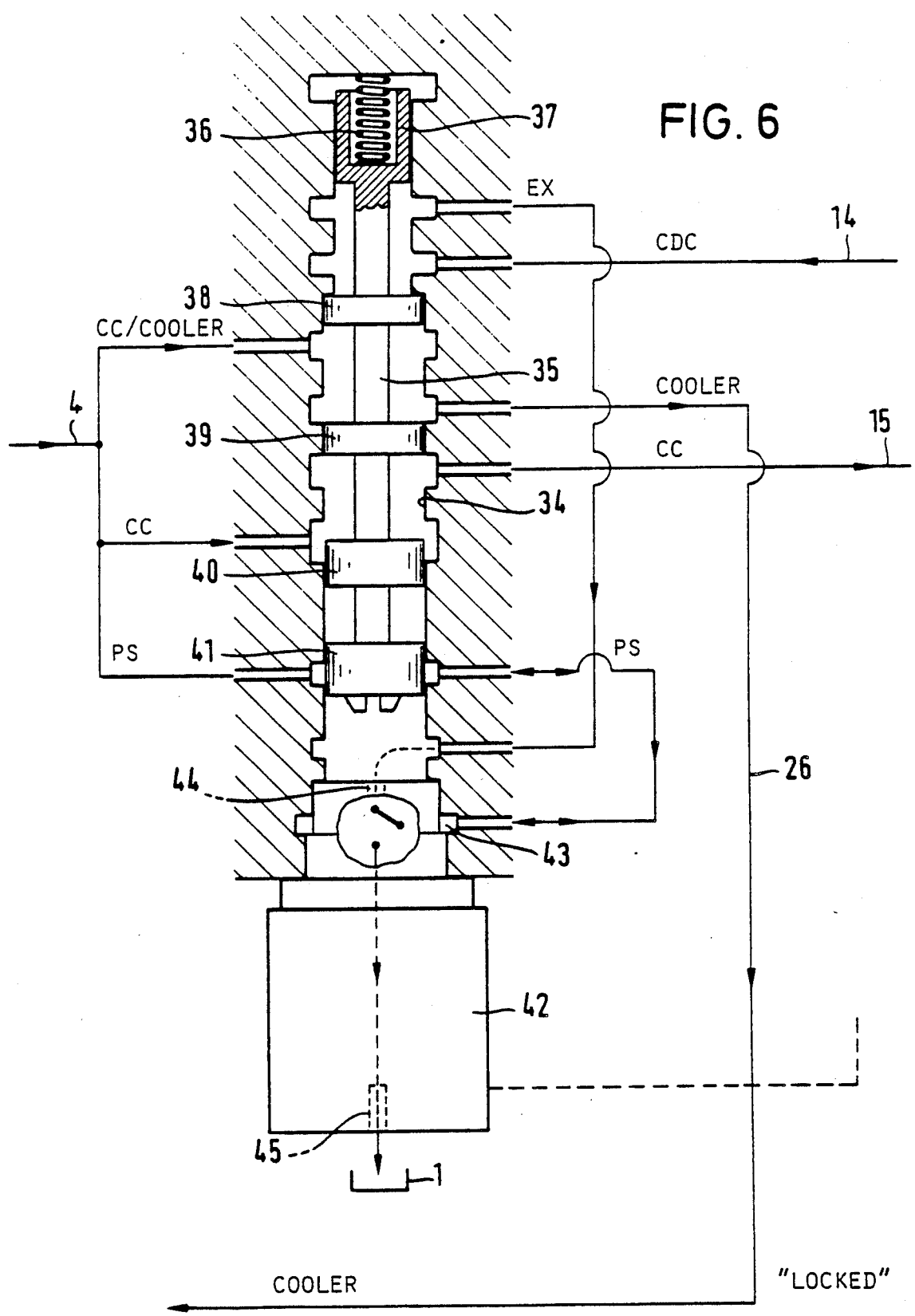
FIG. 6 is a cross section similar to that of FIG. 5 but with the shift position of the solenoid set to increase slippage.

FIGS. 3 and 6 are identical apart from differently named functional pressures in corresponding hydraulic lines and the flow direction of the pressure fluid. FIGS. 3 and 4 show the direction of pressurized fluid flow when the lock-up clutch is open; FIGS. 5 and 6 show the direction of hydraulic fluid flow when the lock-up clutch is applied.

The mode of operation of the control unit according to the invention is described next.

When the lock-up clutch is completely opened (as in FIG. 3), the pulse width applied to solenoid 42 is 0%, i.e., the pressure fluid opening 43 is fully closed and control pressure PS is therefore blocked. The chamber beneath valve spool 35 is connected to sump by openings 44 and 45, which are fully connected together when the pulse width is 0%. The chamber beneath the valve is therefore pressure free, and spring 36 presses valve spool 35 into its lower end position, where the fluid stream opens the lock-up clutch completely.

Closure of the lock-up clutch (shown in FIG. 4) begins by shifting the pulse width to 100%, i.e., fluid opening 45 is fully closed and control pressure PS passes through the fluid openings 43 and 44, which are fully connected together, to the underside of valve spool 35. The valve spool is therefore pressed against the spring force to the upper end position, where the pressurized fluid stream applies the lock-up clutch, as shown in FIGS. 5 and 6. Control pressure PS is blocked by control land 41, but valve spool 35 nevertheless remains in its upper end position because pressure present in release chamber 12 passes through line 14 to the underside of valve spool 35.

Regulation of slippage by altering the pressure in release chamber 12 is described in more detail below in connection with FIGS. 5 and 6.

FIG. 5 shows the shift position of the solenoid for reducing slippage. For example, if when accelerating, actual slippage is too great owing to the increase in the difference between the speed of the driving shaft and the speed of the driven shaft, the magnitude of desired slippage in the characteristics map is read, compared with the magnitude of actual slippage, and a signal corresponding to this deviation is transmitted to the lock-up clutch pressure control valve 33. This signal has a relatively small pulse width. Solenoid 42 therefore keeps fluid opening 43 closed for a higher percentage of time, and fluid openings 44 and 45 communicate mutually for a higher percentage of time, as shown in FIG. 5. As a result, pressure in release chamber 12 decreases more significantly over line 14 so that a greater pressure difference across the lock-up clutch prevails and clutch plate 10 is consequently applied with a greater clutch force.

FIG. 6 shows the shift position of the solenoid for increasing slippage. If slippage becomes too low during deceleration, the lock-up clutch pressure control valve 33 is again triggered to produce the desired slippage, the corresponding slippage value stored in the characteristics map. Thereafter, current signal has a relatively large pulse width. Therefore, solenoid 42 keeps the fluid opening 45 closed for a higher percentage of time and pressure medium openings 43 and 44 communicate mutually for a higher percentage of time, as shown in FIG. 6.

Release chamber 12 is therefore blocked through line 14 by control land 41, with the result that pressure in release chamber 12 increases through throttle openings 18. The pressure difference across the clutch plate therefore decreases so that clutch plate 10 is applied with a reduced clutch force, causing slippage to increase as desired. Appropriate regulation takes place until the actual slippage corresponds to a desired slippage value stored in a characteristics map accessible to the control unit.

This mode of operation is substantially the same regardless whether an independent pulse-width modulated solenoid valve 32 follows lock-up clutch control valve 33, as shown in FIGS. 1 and 2, or whether lock-up clutch pressure control valve 35 is actuated by a closely located, pulse-width modulated solenoid 42, as shown in FIGS. 3-6.

Figure 7:
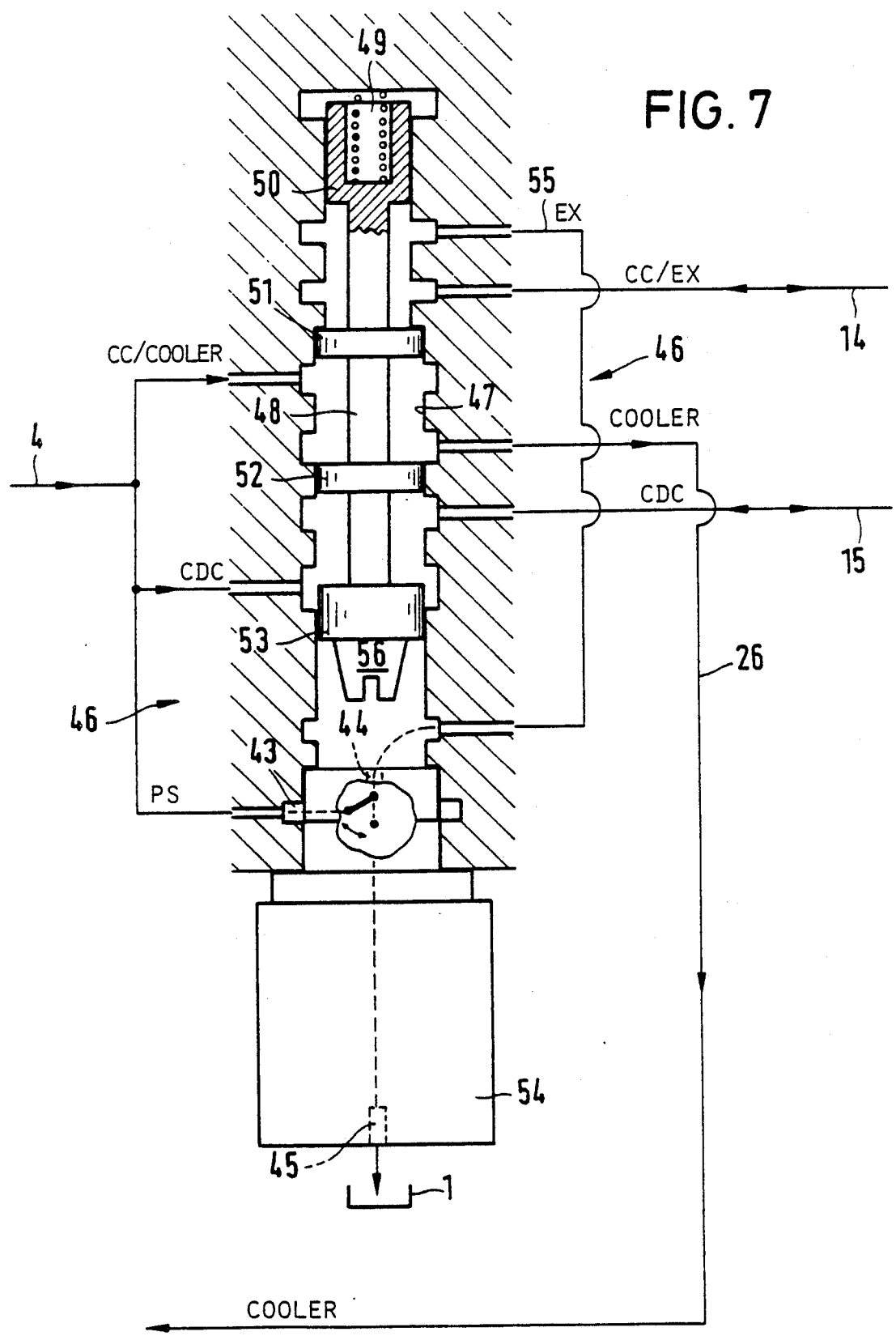
FIG. 7 is an illustration similar to that of FIG. 6 showing a third embodiment of the invention in which a lock-up pressure control valve has an active increase in opposing pressure when the lock-up clutch is applied.

FIG. 7 shows another embodiment of the invention in which there is again provided only one lock-up clutch pressure control valve 46. This valve includes a valve spool 48 located in a valve cylinder 47 and held in its starting position by a valve spring 49.

Valve spool 48 is provided with control lands 50, 51, 52 and 53 and is actuated through a pulse-width modulated solenoid 54 so that the application and release function as well as slippage of the lock-up clutch can be controlled.

Control pressure PS is not blocked by control land 41 when the lock-up clutch is applied, as in the embodiment of FIGS. 5 and 6, but rather is applied to fluid opening 43 of solenoid 54. Therefore, control pressure actively influences the pressure in release chamber 12.

The mode of operation of the control unit according to the invention is described below.

If slippage is to be increased, a signal having a relatively low pulse width is applied at solenoid 54. Solenoid 54 therefore keeps fluid opening 45 closed for a higher percentage of time and the pressure medium openings 43 and 44 join together for a higher percentage of time.

Control pressure PS passes through these openings 43 and 44 through lines 14, 55 to the release chamber 12 to increase the pressure within that chamber. This action causes the pressure difference across the clutch plate to decrease and clutch plate 10 to be applied with a reduced force so that slippage increases.

The mode of operation for reducing slippage corresponds precisely to the embodiment of the invention described with reference to FIG. 5.

Because of blockage of fluid opening 43, which blocks control pressure PS for a higher percentage of time, and because of the connection of the fluid openings 44 and 45 for a higher percentage of time, pressure in release chamber 12 decreases through lines 14, 55 so that the pressure difference across the clutch plate increases and slippage is reduced.

We claim:

1. A system for controlling operation of a torque converter clutch, comprising:

torque converter means for hydrodynamically driveably connecting an input member and an output member, including clutch means for mechanically driveably connecting and disconnecting said input member and output member, an apply chamber pressurized to urge the clutch toward a disengaged state, a release chamber pressurized to urge the clutch toward an engaged state, clutch slip being controlled by the difference in pressure between the apply chamber and release chamber;

a source of line pressure;

an outlet;

a clutch pressure control valve connected to the source of line pressure, the apply chamber and the release chamber, said valve including a spool located in a cylinder supported for sliding movement along the cylinder biased by a spring toward a first position where line pressure is connected to the release chamber and the apply chamber is connected to sump to disengage the clutch, the spool being urged by pressure against the effect of the spring to a second position where line pressure is connected to the apply chamber and the release chamber is connected to the outlet to engage the clutch;

a lock-up clutch control valve located in the outlet, actuated by a first solenoid;

means for producing signals representing speed of the torque converter input and speed of the torque converter output; and control means for actuating the first solenoid to open and close the outlet to sump in response to a desired magnitude of clutch slip corresponding to the speed difference between the torque converter input and output speeds, thereby controlling the difference in pressure between the release chamber and apply chamber to produce the desired clutch slip.

2. The system of claim 1 wherein the torque converter further comprises throttle holes continually communicating said apply chamber and release chamber regardless of the state of the clutch.

3. The system of claim 1 further comprising a second solenoid actuated by an output signal produced by the control means to open and close the source of line pressure admitted to the clutch pressure control valve.

4. The system of claim 1 further comprising:

a source of control pressure;

a second solenoid actuated by output produced by the control means to open and close the source of control pressure admitted to the control valve against the effect of the spring; and the spool being urged by control pressure against the effect of the spring to a second position where line pressure is connected to the apply chamber, and the release chamber is connected to the outlet to engage the clutch.

5. A system for controlling operation of a torque converter clutch, comprising:

torque converter means for hydrodynamically driveably connecting an input member and an output member, including clutch means for mechanically driveably connecting and disconnecting said input member and output member, an apply chamber pressurized to urge the clutch toward a disengaged state, a release chamber pressurized to urge the clutch toward an engaged state, clutch slip being controlled by the difference in pressure between the apply chamber and release chamber;

a source of line pressure;

an outlet;

a clutch pressure control valve connected to the source of line pressure, the apply chamber and the release chamber, said valve including a spool located in a cylinder supported for sliding movement along the cylinder, having first, second, third and fourth lands spaced mutually along the spool, biased by a spring toward a first position where line pressure is connected between the first and second lands to the release chamber and the apply chamber is connected between the second and third lands to sump to disengage the clutch, the spool being urged by pressure acting on the fourth land against the effect of the spring to a second position where line pressure is connected between the third and fourth lands to the apply chamber and the release chamber is connected between the first and second lands to the outlet to engage the clutch;

a lock-up clutch control valve located in the outlet, actuated by a first solenoid;

means for producing signals representing the magnitude of pressure in the apply chamber and in the release chamber;

means for producing signals representing speed of the torque converter input and speed of the torque converter output; and control means for actuating the first solenoid to open and close the outlet to sump in response to a desired magnitude of clutch slip corresponding to the speed difference between the torque converter input and output speeds, thereby controlling the difference in pressure between the release chamber and apply chamber to produce the desired clutch slip.

6. A system for controlling operation of a torque converter clutch, comprising:

torque converter means for hydrodynamically driveably connecting an input member and an output member, including clutch means for mechanically driveably connecting and disconnecting said input member and output member, an apply chamber pressurized to urge the clutch toward a disengaged state, a release chamber pressurized to urge the clutch toward an engaged state, clutch slip being controlled by the difference in pressure between the apply chamber and release chamber;

a source of line pressure;

a clutch pressure control valve connected to the source of line pressure, the apply chamber and the release chamber, said valve including a spool located in a cylinder supported for sliding movement along the cylinder, biased by a spring toward a first position where line pressure is connected to the release chamber and the apply chamber is connected to sump to disengage the clutch, the spool being urged by pressure acting thereon against the effect of the spring to a second position where line pressure is connected to the apply chamber and the release chamber is connected to an outlet to engage the clutch;

a solenoid-actuated valve connected to the outlet, the line pressure source and sump, the clutch pressure control valve spool blocking the line pressure connection to the solenoid-actuated valve when the valve spool is in its second position, the solenoid-actuated valve being moveable between a first state where the line pressure connection to said valve is closed and the outlet is connected to sump, and moveable to a second state where the sump connection to said valve is closed and the outlet is connected to the line pressure source.

7. The system of claim 6 further comprising:

means for producing signals representing the magnitude of pressure in the apply chamber and in the release chamber;

means for producing signals representing speed of the torque converter input and speed of the torque converter output; and control means for producing the state of the solenoid-actuated valve in response to a desired magnitude of clutch slip corresponding to the difference between the torque converter input speed and output speed, thereby controlling the difference in pressure between the release chamber and apply chamber to produce desired clutch slip.

8. The system of claim 7 wherein the control means produces a pulse width modulated signal applied to the solenoid-actuated valve, said signal producing the first state of the solenoid-actuated valve when the pulse width is substantially zero percent and producing the second state of the solenoid-operated valve when the pulse width is substantially one hundred percent.

9. The system of claim 6 wherein the torque converter further comprises throttle holes continually communicating said apply chamber and release chamber regardless of the state of the clutch.

10. A system for controlling operation of a torque converter clutch, comprising:

torque converter means for hydrodynamically driveably connecting an input member and an output member, including clutch means for mechanically driveably connecting and disconnecting said input member and output member, an apply chamber pressurized to urge the clutch toward a disengaged state, a release chamber pressurized to urge the clutch toward an engaged state, clutch slip being controlled by the difference in pressure between the apply chamber and release chamber;

a source of line pressure;

a clutch pressure control valve connected to the source of line pressure, the apply chamber and the release chamber, said valve including a spool located in a cylinder supported for sliding movement along the cylinder, having first, second, third, fourth and fifth lands spaced mutually along the spool, biased by a spring toward a first position where line pressure is connected between the first and second lands to the release chamber and the apply chamber is connected between the second and third lands to sump to disengage the clutch, the spool being urged by pressure acting on the fifth land against the effect of the spring to a second position where line pressure is connected between the third and fourth lands to the apply chamber and the release chamber is connected between the first and second lands to an outlet to engage the clutch;

a solenoid-actuated valve connected to sump, the line pressure source and a pressure surface of the valve spool on which a pressure force opposes the effect of the spring, the clutch pressure control valve spool blocking the line pressure connection to the solenoid-actuated valve when said valve spool is in the second position and blocking the outlet when said valve spool is in the first position, the solenoid-actuated valve moveable to a first state where the line pressure connection to said valve is closed and the valve spool pressure surface is connected to sump, and moveable to a second state where the sump connection to said solenoid-actuated valve is closed and the valve spool pressure surface is connected to the line pressure source.

11. The system of claim 10 further comprising:

means for producing signals representing the magnitude of pressure in the apply chamber and in the release chamber;

means for producing signals representing speed of the torque converter input and speed of the torque converter output; and control means for producing the state of the solenoid-actuated valve in response to a desired magnitude of clutch slip corresponding to the difference between the torque converter input speed and output speed, thereby controlling the difference in pressure between the release chamber and apply chamber to produce desired clutch slip.

12. The system of claim 10 wherein the control means produces a pulse width modulated signal applied to the solenoid-actuated valve, said signal producing the first state of the solenoid-actuated valve when the pulse width is substantially zero percent and producing the second state of the solenoid-operated valve when the pulse width is substantially one hundred percent.

13. The system of claim 10 wherein the torque converter further comprises throttle holes continually communicating said apply chamber and release chamber regardless of the state of the clutch.

14. A system for controlling operation of a torque converter clutch, comprising:

torque converter means for hydrodynamically driveably connecting an input member and an output member, including clutch means for mechanically driveably connecting and disconnecting said input member and output member, an apply chamber pressurized to urge the clutch toward a disengaged state, a release chamber pressurized to urge the clutch toward an engaged state, clutch slip being controlled by the difference in pressure between the apply chamber and release chamber;

a source of line pressure;

a clutch pressure control valve connected to the source of line pressure, the apply chamber and the release chamber, said valve including a spool located in a cylinder supported for sliding movement along the cylinder, biased by a spring toward a first position where line pressure is connected to the release chamber and the apply chamber is connected to sump to disengage the clutch, the spool being urged by pressure acting against the effect of the spring to a second position where line pressure is connected to the apply chamber and the release chamber is connected to an outlet communicating with a pressure surface of the valve spool on which a pressure force opposes the effect of the spring to engage the clutch;

a solenoid-actuated valve connected to sump, to the line pressure source and to a surface of the valve spool on which a pressure force opposes the effect of the spring, the solenoid-actuated valve moveable to a first state where the line pressure connection to said valve is closed and the outlet of said valve is connected to sump, and moveable to a second state where the sump connection to said solenoid-actuated valve is closed and the outlet of said value is connected to the line pressure source.

15. The system of claim 14 further comprising:

means for producing signals representing the magnitude of pressure in the apply chamber and in the release chamber;

means for producing signals representing speed of the torque converter input and speed of the torque converter output; and control means for producing the state of the solenoid-actuated valve in response to a desired magnitude of clutch slip corresponding to the difference between the torque converter input speed and output speed, thereby controlling the difference in pressure between the release chamber and apply chamber to produce desired clutch slip.

16. The system of claim 14 wherein the control means produces a pulse width modulated signal applied to the solenoid-actuated valve, said signal producing the first state of the solenoid-actuated valve when the pulse width is substantially zero percent and producing the second state of the solenoid-operated valve when the pulse width is substantially one hundred percent.

17. The system of claim 14 wherein the torque converter further comprises throttle holes continually communicating said apply chamber and release chamber regardless of the state of the clutch.

18. A system for controlling operation of a torque converter clutch, comprising:

torque converter means for hydrodynamically driveably connecting an input member and an output member, including clutch means for mechanically driveably connecting and disconnecting said input member and output member, an apply chamber pressurized to urge the clutch toward a disengaged state, a release chamber pressurized to urge the clutch toward an engaged state, clutch slip being controlled by the difference in pressure between the apply chamber and release chamber;

a source of line pressure;

a clutch pressure control valve connected to the source of line pressure, the apply chamber and the release chamber, said valve including a spool located in a cylinder supported for sliding movement along the cylinder, having first, second, third and fourth lands spaced mutually along the spool, biased by a spring toward a first position where line pressure is connected between the first and second lands to the release chamber and the apply chamber is connected between the second and third lands to sump to disengage the clutch, the spool being urged by pressure acting on the fourth land against the effect of the spring to a second position where line pressure is connected between the third and fourth lands to the apply chamber and the release chamber is connected between the first and second lands to an outlet communicating with a pressure surface of the valve spool on which a pressure force opposes the effect of the spring to engage the clutch;

a solenoid-actuated valve connected to sump, to the line pressure source and to a surface of the valve spool on which a pressure force opposes the effect of the spring, the solenoid-actuated valve moveable to a first state where the line pressure connection to said valve is closed and the outlet is connected to sump, and moveable to a second state where the sump connection to said solenoid-actuated valve is closed and the outlet is connected to the line pressure source.

* * * * *